United States Patent [19]

Mink et al.

[11] Patent Number: 5,260,245
[45] Date of Patent: Nov. 9, 1993

[54] HIGH ACTIVITY POLYETHYLENE CATALYSTS

[75] Inventors: Robert I. Mink, Warren; Thomas E. Nowlin, West Windsor, both of N.J.

[73] Assignee: Mobil Oil Corporation, Fairfax, Va.

[21] Appl. No.: 962,557

[22] Filed: Oct. 19, 1992

[51] Int. Cl.$^5$ .............................................. C08F 4/654
[52] U.S. Cl. ..................................... 502/115; 502/117; 502/120; 502/125; 502/127; 526/129; 526/142; 526/143
[58] Field of Search ............... 502/115, 117, 120, 125, 502/127

[56] References Cited

U.S. PATENT DOCUMENTS

| | | | |
|---|---|---|---|
| 2,905,645 | 9/1959 | Anderson et al. | 252/129 |
| 2,912,419 | 11/1959 | Peters et al. | 260/93.7 |
| 2,936,291 | 5/1960 | Peters et al. | 252/131 |
| 3,052,660 | 9/1962 | Osgan | 260/88.2 |
| 3,574,138 | 4/1971 | Ziegler | 252/429 |
| 3,787,384 | 1/1974 | Stevens et al. | 260/94.9 |
| 4,148,754 | 4/1979 | Strobel et al. | 252/429 |
| 4,296,223 | 10/1981 | Berger | 526/125 |
| 4,378,304 | 2/1983 | Dombro | 252/429 |
| 4,458,058 | 7/1984 | Dombro | 526/129 |
| 4,478,988 | 10/1984 | Pullukat et al. | 526/128 |
| 4,558,024 | 12/1985 | Best | 502/115 |
| 4,558,025 | 12/1985 | Best | 502/115 |
| 4,579,835 | 4/1986 | Best | 502/120 |
| 4,672,096 | 6/1987 | Nowlin | 526/129 |
| 4,727,049 | 2/1988 | Furuhashi et al. | 502/115 |
| 4,732,882 | 3/1988 | Allen et al. | 502/103 |
| 4,833,111 | 5/1989 | Nowlin | 502/107 |
| 4,849,389 | 7/1989 | Nowlin et al. | 502/107 |
| 4,888,318 | 12/1989 | Allen et al. | 502/105 |
| 5,077,255 | 12/1991 | Welborn, Jr. | 502/104 |

FOREIGN PATENT DOCUMENTS 435557 7/1991 European Pat. Off. .

OTHER PUBLICATIONS

Macromolecules, vol. 15, No. 3, 1982, pp. 831–834, "Isotactic Polymerization of Propene: Stereoregularity of the Insertion of the First Monomer Unit as a Fingerprint of the Catalytic Active Site".

*Primary Examiner*—Patrick P. Garvin
*Attorney, Agent, or Firm*—Alexander J. McKillop; Malcolm D. Keen; Marina V. Schneller

[57] ABSTRACT

A catalyst for producing higher flow index linear low density polyethylene with relatively narrower molecular weight distributions is described. The catalyst is formed by treating silica having reactive OH groups with a dialkylmagnesium in a solvent for said dialkylmagnesium; then adding to said solvent a carbonyl containing compound to form an intermediate which is subsequently treated with a transition metal to form a catalyst precursor. The catalyst precursor is activated with triethylaluminum.

20 Claims, No Drawings

HIGH ACTIVITY POLYETHYLENE CATALYSTS

FIELD OF THE INVENTION

The present invention relates to a method for copolymerizing ethylene and alpha-olefins, a catalyst for such a polymerization and a method for producing such a catalyst. A particular aspect of the present invention relates to a method for producing linear low density copolymers of ethylene, hereinafter referred to as "LLDPE".

LLDPE resins possess properties which distinguish them from other polyethylene polymers such as homopolymers of polyethylene. Certain of these properties are described in the Anderson et al U.S. Pat. No. 4,076,698.

BACKGROUND OF THE INVENTION

When the LLDPE resins are fabricated into injection-molded products, it is imperative to assure that such products are not susceptible to warping or shrinking. As is known to those skilled in the art, the degree of warping or shrinking can be predicted from the molecular weight distribution of the resins. Resins having a relatively narrow molecular weight distribution produce injection-molded products exhibiting a minimum amount of warping or shrinkage. Conversely, resins having a relatively broader molecular weight distribution produce injection-molded products more likely to undergo warping or shrinkage.

One of the measures of the molecular weight distribution of the resin is melt flow ratio (MFR), which is the ratio of high melt flow index (HLMI or $I_{21}$) to melt index ($I_2$) for a given resin. The MFR value is believed to be an indication of the molecular weight distribution of the polymer, the higher the value, the broader the molecular weight distribution. Resins having relatively low MFR values, e.g., of about 20 to about 50, have relatively narrow molecular weight distributions. Additionally, LLDPE resins having such relatively low MFR values produce films of better strength properties than resins with high MFR values.

Flow index response is attributable to the catalyst system used in polymerization.

The molecular weight of ethylene copolymers may be controlled in a known manner, e.g., by using hydrogen. With the catalysts produced according to the present invention, molecular weight may be suitably controlled with hydrogen when the polymerization is carried out at relatively low temperatures, e.g., from about 30° to about 105° C. This control of molecular weight may be evidenced by a measurable positive change in melt index ($I_2$) of the polymer produced.

Another important property of catalyst compositions for ethylene/alpha-olefin copolymerization is the ability thereof to effectively copolymerize ethylene with higher alpha-olefins, e.g., $C_3$-$C_{10}$ alpha-olefins, to produce resins having low densities. This property of the catalyst composition is referred to as "higher alpha-olefin incorporation property" and is usually measured by determining the amount of a higher alpha-olefin (e.g., 1-butene, 1-hexene or 1-octene) required in the polymerization process, e.g. fluid-bed reactor process, to produce a copolymer of ethylene and the higher alpha-olefin having a given density. The lesser is the amount of the higher alpha-olefin required to produce a resin of a given density, the higher are the production rates and, therefore, the lower is the cost of producing such a copolymer. A high value of an alpha-olefin incorporation factor is especially important in the gas-phase fluid bed process, because relatively high concentrations of higher alpha-olefins in the fluid-bed reactor may cause poor fluidization caused, e.g., by resin stickiness. Therefore, production rates must be significantly reduced to avoid such problems. Consequently, catalyst compositions with relatively high alpha-olefin incorporation factor values avoid these problems and are more desirable.

Accordingly, it is important to provide a catalyst composition capable of producing ethylene copolymers having a relatively narrow molecular weight distribution (low MFR values) and low densities.

It is therefore a primary object of the present invention to provide a high activity catalyst for the polymerization of alpha-olefins yielding products of a relatively narrow molecular weight distribution.

It is an additional object of the present invention to provide a catalytic process for copolymerizing ethylene and alpha-olefins which yields LLDPE resins of a relatively narrow molecular weight distribution at high productivity.

SUMMARY OF THE INVENTION

A supported catalyst composition of this invention is prepared in a multi-step process. In the first step, a mixture of a solid, porous carrier and a non-polar liquid, specifically a solvent, is contacted with at least one organomagnesium compound of the formula $$R_m Mg R'_n$$

where R and R' are the same or different $C_2$-$C_{12}$ alkyl groups, preferably $C_4$-$C_{10}$ alkyl groups, more preferably $C_4$-$C_8$ alkyl groups, and most preferably both R and R' are butyl groups, and m and n are each 0, 1 or 2, providing that m+n=2.

Subsequently, the mixture of the first step is contacted with at least one carbonyl compound. The carbonyl treated mixture is then contacted with at least one transition metal compound soluble in the non-polar solvent. The resulting mixture is subsequently contacted, for activation and activated catalyst production, with a trialkylaluminum.

The resulting activated catalyst composition has substantially higher activity and thus exhibits relatively high productivity in the copolymerization of ethylene and alpha-olefins. The catalyst also produces polymers having a narrow molecular weight distribution. The molecular weight distribution is narrower than that of polymers produced with catalytic compositions free of the carbonyl compound. The catalyst also produces polymers having increased flow index; that is, the flow index is greater than that of polymers produced with catalytic compositions free of the carbonyl compound

DETAILED DESCRIPTION

In accordance with the present invention, a supported titanium compound is incorporated onto a suitable support by impregnating this support first with a reactive magnesium compound and utilizing this supported magnesium compound to react with a tetravalent titanium compound in a liquid medium. The unreacted titanium compound remains soluble in this liquid medium, while the reacted titanium species and the supported magnesium species are insoluble in this liquid medium.

As used herein, the concept of supporting a material on a carrier is intended to connote the incorporation of material (e.g., magnesium compounds and/or titantium compounds) onto the carrier by physical or chemical means. Accordingly, supported material need not necessarily be chemically bound to the carrier.

Catalysts produced according to the present invention may be described in terms of the manner in which they can be made. More particularly, these catalysts can be described in terms of the manner in which a suitable carrier may be treated in order to form such catalysts.

Suitable carrier materials which may be treated include solid, porous carrier materials such as silica, alumina and combinations thereof Such carrier materials may be amorphous or crystalline in form. These carriers may be in the form of particles having a particle size of from about 0.1 micron to about 250 microns, preferably from 10 to about 200 microns, and most preferably from about 10 to about 80 microns. Preferably, the carrier is in the form of spherical particles, e.g., spray dried silica.

The carrier material is also porous. The internal porosity of these carriers may be larger than 0.2 cm$^3$/gm, e.g., larger than about 0.6 cm$^3$/g. The specific surface area of these carriers is at least 3 m$^2$/g, preferably at least about 50 m$^2$/g, and more preferably from, e.g., about 150 to about 1500 m$^2$/g.

It is desirable to remove physically bound water from the carrier material prior to contacting this material with water-reactive magnesium compounds. This water removal may be accomplished by heating the carrier material to a temperature from about 100° C. to an upper limit of temperature represented by the temperature at which sintering occurs. A suitable range of temperatures may, thus, be from about 100° C. to about 800° C., e.g., from about 150° C. to about 650° C.

Silanol groups (Si-OH) may be present when the carrier is contacted with water-reactive magnesium compounds in accordance with the present invention. These Si-OH groups may be present at from about 0.5 to about 3 mmoles of OH groups per gram of carrier, but a preferred range is from about 0.4 to about 1.5 mmoles of OH groups per gram of carrier. Excess OH groups present in the carrier may be removed by heating the carrier for a sufficient time at a sufficient temperature to accomplish the desired removal. More particularly, for example, a relatively small number of OH groups may be removed by sufficient heating at from about 150° C. to about 250° C., whereas a relatively large number of OH groups may be removed by sufficient heating at least 500° or 800° C., most especially, from about 550° C. to about 650° C. The duration of heating may be from 4 to 16 hours. In a most preferred embodiment, the carrier is silica which, prior to the use thereof in the first catalyst synthesis step, has been dehydrated by fluidizing it with nitrogen or air and heating at least about 600° C. for about 16 hours to achieve a surface hydroxyl group concentration of about 0.7 millimoles per gram (mmol/gm). The surface hydroxyl concentration of silica may be determined according to J. B. Peri and A. L. Hensley, Jr., *J. Phys. Chem.*, 72 (8), 2926 (1968). The silica of the most preferred embodiment is a high surface area, amorphous silica (surface area=300 m$^2$/gm; pore volume of 1.65 cm$^3$/gm), and it is a material marketed under the tradenames of Davison 952 or Davison 955 by the Davison Chemical Division of W. R. Grace and Company. When silica which has been dehydrated by fluidizing with nitrogen or air and heating at about 600° C. for about 16 hours, the surface hydroxyl concentration is about 0.72 mmols/g.

While heating is a preferred means of removing OH groups inherently present in a carrier such as silica, other removal means are also possible such as chemical means. For example, a desired proportion of OH groups may be reacted with a chemical agent such as a hydroxyl reactive aluminum compound, e.g., triethylaluminum.

Other examples of suitable carrier materials are described in the Graff, U.S. Pat. No. 4,173,547. Note particularly the passage extending from column 3, line 62 to column 5, line 44 of this Graff patent. It is noted that internal porosity of carriers can be determined by a technique termed BET-technique, described by S. Brunauer, P. Emmett and E. Teller in *Journal of the American Chemical Society*, 60, pp. 209-319 (1938). Specific surface areas of carriers can also be measured in accordance with the above-mentioned BET-technique, with use of the standardized method as described in *British Standards* BS 4359, Volume 1, (1969).

The carrier material is slurried in a non-polar solvent and the resulting slurry is contacted with at least one organomagnesium compound. The slurry of the carrier material in the solvent is prepared by introducing the carrier into the solvent, preferably while stirring, and heating the mixture to about 25° to about 100° C., preferably to about 40° to about 60° C. The slurry is then contacted with the aforementioned organomagnesium compound, while the heating is continued at the aforementioned temperature.

The organomagnesium compound has the empirical formula

$$R_m Mg R'_n$$

where R and R' are the same or different C$_2$-C$_{12}$ alkyl groups, preferably C$_4$-C$_{10}$ alkyl groups, more preferably C$_4$-C$_8$ alkyl groups, and most preferably both R and R' are butyl groups, and m and n are each 0, 1 or 2, providing that m+n=2.

Suitable non-polar solvents are materials in which all of the reactants used herein, e.g., the organomagnesium compound, the transition metal compound, and the carbonyl compound are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene and ethylbenzene, may also be employed. The most preferred non-polar solvents are isopentane, hexane, or heptane. Prior to use, the non-polar solvent should be purified, such as by percolation through silica gel and/or molecular sieves, to remove traces of water, oxygen, polar compounds, and other materials capable of adversely affecting catalyst activity.

In the most preferred embodiment of the synthesis of this catalyst it is important to add only such an amount of the organomagnesium compound that will be deposited—physically or chemically—onto the support since any excess of the organomagnesium compound in the solution may react with other synthesis chemicals and precipitate outside of the support. The carrier drying temperature affects the number of sites on the carrier available for the organomagnesium compound—the higher the drying temperature the lower the number of sites. Thus, the exact molar ratio of the organomagnesium compound to the hydroxyl groups will vary and must be determined on a case-by-case basis to assure that only so much of the organomagnesium compound is added to the solution as will be deposited onto the support without leaving any excess of the organomagnesium compound in the solution. Thus, the molar ratios given below are intended only as an approximate guideline and the exact amount of the organomagnesium compound in this embodiment must be controlled by the functional limitation discussed above, i.e., it must not be greater than that which can be deposited onto the support. If greater than that amount is added to the solvent, the excess may react with the reagents added subsequently, thereby forming a precipitate outside of the support which is detrimental in the synthesis of our catalyst and must be avoided. The amount of the organomagnesium compound which is not greater than that deposited onto the support can be determined in any conventional manner, e.g., by adding the organomagnesium compound to the slurry of the carrier in the solvent, while stirring the slurry, until the organomagnesium compoundion is detected in the solvent.

For example, for the silica carrier heated at about 600° C., the amount of the organomagnesium compound added to the slurry is such that the molar ratio of Mg to the hydroxyl groups (OH) in the solid carrier is about 1:1 to about 4:1, preferably about 1.1:1 to about 2.8:1, more preferably about 1.2:1 to about 1.8:1 and most preferably about 1.4:1.

It is also possible to add such an amount of the organomagesium compound which is in excess of that which will be deposited onto the support, and then remove, e.g., by filtration and washing, the organomagnesium compound not deposited onto the carrier. However, this alternative is less desirable than the most preferred embodiment described above.

Preferably, the carrier should be impregnated such that the pores of same contain the reactive solid magnesium compound. A preferred means of accomplishing this result is by incorporating a porous carrier in a liquid medium containing dissolved organomagnesium compound and allowing magnesium to become impregnated into the pores of the carrier by a reaction of the organomagnesium compound. Evaporation of the non-polar solvent which is a non-Lewis base liquid from this step would obtain a carrier, containing magnesium, in the form of a dry, free-flowing powder.

The amount of magnesium compound which is impregnated onto the carrier should be sufficient to react with the carbonyl compound and then the tetravalent titanium compound in order to incorporate a catalytically effective amount of titanium on the carrier in the manner set forth herein below. When a liquid containing an organomagnesium compound is contacted with a carrier the amount of magnesium in this liquid in terms of mmoles may be essentially the same as that stated above with respect to that which is impregnated onto the carrier.

An essential component in the production of the catalyst composition of the invention is a carbonyl compound, which is added as a component to the catalyst or catalyst precursor preparation. The carbonyl compound is of the formula

wherein R is phenyl or alkyl of 1 to 12 carbon atoms and R' is Cl—, alkyl of 1 to 6 carbon atoms or —OR" wherein R" is phenyl alkyl of 1 to 8 carbon atoms. The compound is added in an amount effective to decrease the molecular weight distribution of the copolymer or in amounts effective to increase catalyst activity. Generally the amount of this compound is such that the molar ratio of carbonyl compound to Mg ranges from 0.40 to 1.40.

The slurry of the carrier material containing the organomagnesium species in the solvent is maintained at temperatures of about 40° to about 60° C., for introduction of the carbonyl compound. The carbonyl compound is introduced after organomagnesium incorporation and preferably before transition metal incorporation into the catalyst. The amount of the carbonyl compound added to the slurry is such that the molar ratio of carbonyl to Mg on the solid carrier is about 0.40 to about 1.40.

The slurry is then contacted with at least one transition metal compound soluble in the non-polar solvent. This synthesis step is conducted at about 25° to about 65° C., preferably at about 30° to about 60° C., and most preferably at about 45° to about 55° C. In a preferred embodiment, the amount of the transition metal compound added is not greater than that which can be deposited onto the carrier. The exact molar ratio of Mg to the transition metal and of the transition metal to the hydroxyl groups of the carrier will therefore vary (depending, e.g., on the carrier drying temperature) and must be determined on a case-by-case basis. For example, for the silica carrier heated at about 200° to about 850° C., the amount of the transition metal compound is such that the molar ratio of the transition metal, derived from the transition metal compound, to the hydroxyl groups of the carrier is about 1 to about 2.0, preferably about 1.3 to about 2.0. The amount of the transition metal compound is also such that the molar ratio of Mg to the transition metal is about 0.5 to about 3, preferably about 1 to about 2. These molar ratios appear to produce a catalyst composition which produces resins having relatively low MFR values of about 20 to about 35. As is known to those skilled in the art, such resins can be utilized to produce high strength films or injection molding products which are resistant to warping and shrinking.

Suitable transition metal compounds used herein are compounds of metals of Groups IVA, VA, VIA or VIII of the Periodic Chart of the Elements, as published by the Fisher Scientific Company, Catalog No. 5-702-10, 1978 providing that such compounds are soluble in the non-polar solvents. Non-limiting examples of such compounds are titanium halides, e.g., titanium tetrachloride, titanium alkoxides (e.g., where the alkoxide moiety contains an alkyl radical of 1 to 6 carbon atoms, or mixtures thereof, and vanadium halides (vanadium tetrachloride), vanadium oxytrichloride, and vanadium alkoxides. The preferred transition metal compounds are titanium compounds, preferably tetravalent titanium compounds. The most preferred titanium compound is titanium tetrachloride. Mixtures of such transition metal compounds may also be used and generally no restrictions are imposed on the transition metal compounds which may be included. Any transition metal compound that may be used alone may also be used in conjunction with other transition metal compounds.

The reaction of the transition metal compound, such as the tetravalent titanium compound, in the liquid medium conveniently takes place by slurrying the solid carrier containing the reactive magnesium species in a solution of the tetravalent titanium compound and heating the reaction medium to a suitable reaction temperature, e.g., to the reflux temperature of the solvent at standard atmospheric pressure. Thus, the reaction may take place under reflux conditions. Preferred solvents for the tetravalent titanium compound are heptane or hexane or isopentane.

The various reaction parameters are subject to a wide variety of possibilities, suitable selection of such parameters being well within the skill of those having ordinary skill in the art. However, for example, the volume of tetravalent titanium solution to treated carrier initially slurried in the solution may be from about 0.1 to about 10 ml per gram of such carrier. The concentration of the tetravalent titanium solution may be, for example, from about 0.1 to about 9 Molar. The amount of tetravalent titanium in solution may be, e.g., in excess of the molar amount of organomagnesium earlier used to treat the carrier. More particularly, for example, the molar ratio of tetravalent titanium to organomagnesium may be from about 0.3 to about 2, more particularly from about 0.7 to about 1.4. Unreacted titanium compounds may be removed by suitable separation techniques such as decantation, filtration and washing.

The supported catalyst precursor formed from components described above is then activated with suitable activators. Suitable activators include organometallic compounds. Preferably, the activators are trialkylaluminum compounds. More preferably, the activator is triethylaluminum.

The catalyst precursor may be activated in situ by adding the activator and catalyst precursor separately to the polymerization medium. It is also possible to combine the catalyst precursor and activator before introduction into the polymerization medium, e.g., for up to about 2 hours at a temperature from about $-40°$ to about 80° C.

A suitable activating amount of the activator may be used. The number of moles of activator per gram atom of titanium in the catalyst may be, e.g., from about 1 to about 100 and is preferably greater than about 5.

Alpha-olefins may be polymerized with the catalysts prepared according to aspects of the present invention by any suitable process. Such processes include polymerizations carried out in suspension, in solution or in the gas phase. Gas phase polymerizations are preferred such as those taking place in stirred bed reactors and, especially, fluidized bed reactors.

The molecular weight of the polymer may be controlled in a known manner, preferably by using hydrogen. With the catalysts produced according to the present invention, molecular weight may be suitably controlled with hydrogen when the polymerization is carried out at relatively low temperatures, e.g., from about 30° to about 105° C.

The catalysts prepared according to the present invention are highly active and may have an activity of at least from about 2,000 to about 8,000 in terms of grams of polymer produced per hour per gram of catalyst per 100 psi of ethylene pressure.

The catalysts prepared according to the present invention are particularly useful for the production of LLDPE resins. Such LLDPE resins may have a density of 0.94 g/cc or less, preferably 0.930 or less or even 0.925 g/cc or less. In accordance with certain aspects of the present invention, it is possible to achieve densities of less than 0.915 g/cc and even 0.900 g/cc.

Advantageous properties of LLDPE resins are described in the Anderson et al. U.S. Pat. No. 4,076,698. These resins may be copolymers of ethylene with one or more $C_3$-$C_{10}$ alpha-olefins. Thus, copolymers having two monomeric units are possible as well as terpolymers having three monomeric units. Particular examples of such polymers include ethylene/1-butene copolymers, ethylene/1-hexene copolymers, ethylene/4-methyl-1-pentene copolymers, ethylene/1-butene/1-hexene terpolymers, ethylene/propylene/1-hexene terpolymers and ethylene/propylene/1-butene terpolymers.

The molecular weight distribution of the polymers prepared in the presence of the catalysts of the present invention, as expressed by the MFR values, varies from about 20 to 35, preferably about 25-29, for LLDPE products having a density of about 0.900 to about 0.940 g/cc, and an $I_2$ (melt index) of about 0.1 to about 100. As is known to those skilled in the art, such MFR values are indicative of a relatively narrow molecular weight distribution of the polymer. As is also known to those skilled in the art, such MFR values are indicative of polymers especially suitable for injection molding applications since polymers having such MFR values exhibit relatively low amounts of warpage and shrinkage on cooling of the injection molded products. The relatively low MFR values of the polymers prepared with the catalysts of this invention also indicate that these resins are suitable for the preparation of various film products since such films are likely to have excellent strength properties.

The LLDPE resins produced in accordance with the present invention preferably contain at least about 80 percent by weight of ethylene units. Most preferably, the LLDPE resins of the invention contain at least 2 weight percent, for example from 2 to 20 weight percent of an alpha olefin.

A particularly desirable method for producing LLDPE resins, according to the present invention, is in a fluid bed reactor. Such a reactor and means for operating same is described in the Levine et al U.S. Pat. No. 4,011,382 or the Karol et al U.S. Pat. No. 4,302,566, each of which is relied upon and incorporated by reference herein. The activity of the catalyst produced in accordance with the present invention is sufficient to produce an LLDPE resin such as an ethylene/1-hexene copolymer, e.g., having a density of less than 0.940 g/cc, in such a fluid bed reactor.

In order to achieve the desired density ranges in the copolymers it is necessary to copolymerize enough of the alpha-olefin comonomers with ethylene to achieve a level of 1 to 5 mol percent of the comonomer in the copolymer. The amount of the comonomer needed to achieve this result will depend on the particular comonomer(s) employed.

In accordance with the invention, it has unexpectedly been found that using a gas phase catalytic polymerization reaction, 1-hexene can be incorporated into an ethylene-based copolymer chain with high efficiency. In other words, a relatively small concentration of 1- hexene monomer in the gas phase reactor can lead to a relatively large incorporation of 1-hexene into the copolymer. Thus, 1-hexene can be incorporated into an ethylene-base copolymer chain in a gas phase reactor in amounts up to 15 percent by weight, preferably 4 to 12 percent by weight, to produce an LLDPE resin having a density of less than 0.940 g/cc.

It is essential to operate the fluid bed reactor at a temperature below the sintering temperature of the polymer particles. For the production of ethylene copolymers in the process of the present invention an operating temperature of about 30° to 115° C. is preferred, and a temperature of about 75° to 95° C. is most preferred. Temperatures of about 75° to 90° C. are used to prepare products having a density of about 0.91 to 0.92, and temperatures of about 80° to 100° C. are used to prepare products having a density of about 0.92 to 0.94, and temperatures of about 90° to 115° C. are used to prepare products having a density of about 0.94 to 0.96.

The fluid bed reactor is operated at pressures of up to about 1000 psi, and is preferably operated at a pressure of from about 150 to 350 psi.

Films having especially desirable properties may be formed with the above-mentioned ethylene/1-hexene copolymers prepared with the catalysts of the present invention by a variety of techniques. For example, desirable blown films as well as slot cast films may be formed.

Blown films formed from ethylene/1-hexene copolymers having a density from 0.916 to 0.928 g/cc may have especially desirable properties for bag manufacture. For example, such blown films may be fabricated into trash bags. A particular example of a blown film formed from an ethylene/1-hexene copolymer having a density of 0.927 and an $I_2$ of 1 (ASTM D-1238, condition E), which is, in turn, formed in a gas phase, fluid bed reactor with a catalyst according to the present invention, is a blown film having an improved dart impact strength, enhanced Elmendorf tear strength in the machine direction of the film (MD) and higher tensile strength.

Slot cast films formed from LLDPE ethylene/1-hexene copolymers having a density of from about 0.916 to about 0.92 may have especially desirable properties as pallet stretch wrap. A particular example of a slot cast film formed from an ethylene/1-hexene copolymer having a density of about 0.92 and an $I_2$ of 1.7 (ASTM D-1238, condition E), which is, in turn, formed in a gas phase, fluid bed reactor with a catalyst according to the present invention, is a slot cast film having a thickness of 1 mil, an improved MD tensile strength and a very high Elmendorf tear strength in the traverse direction of the film.

The following Examples illustrate reactants and parameters which may be used in accordance with aspects of the present invention.

EXAMPLES

EXAMPLE A - PREPARATION OF CATALYST PRECURSOR

All manipulations were conducted under a nitrogen atmosphere by using standard Schlenk techniques. Into a 200 ml Schlenk flask was placed 7.0 grams of Davison grade 955 silica, which was previously dried under a nitrogen purge at 600° C. for about 16 hours. Hexane (90 ml) was added to the silica. Dibutylmagnesium (7.0 mmol) was added to the stirred slurry at 50°-55° C. and stirring was continued for one hour. A carbonyl compound (9.2 mmol) was added to the slurry (50°-55° C.) and stirring was continued for one hour. TiCl₄ (7.0 mmol) was added to the reaction medium (50°-55° C.) and stirring was continued for an additional hour. Hexane was then removed by distillation with a nitrogen purge at 50°-55° C. Yield varied from 8.5-9.5 grams depending on the carbonyl compound employed. Weight percent of Ti in the catalyst precursor varied from 2.56 to 3.62 depending on the carbonyl reagent.

EXAMPLE B - POLYMERIZATION

Ethylene/1-hexene copolymers were prepared with the catalyst precursors of Example A and triethylaluminum. A typical example is shown below.

Polymerization

A 1.6 liter stainless steel autoclave under a slow nitrogen purge at 50° C. was filled with 750 ml dry hexane and 30 ml of dry 1-hexene, and 3.0 mmol of triethylaluminum (TEAL) was added. The reactor was closed, the stirring was increased to 900 rpm, and the internal temperature was increased to 85° C. The internal pressure was raised 12 psi with hydrogen. Ethylene was introduced to maintain the pressure at about 120 psi. The internal temperature was decreased to 80° C., 40 mg of catalyst precursor was introduced into the reactor with ethylene over-pressure, and the internal temperature was increased and held at 85° C. The polymerization was continued for 60 minutes, and then the ethylene supply was stopped and the reactor was allowed to cool to room temperature. The polyethylene was collected and air dried.

Catalyst productivities, polymer flow indexes and MFR values are given in TABLE A below. Catalyst productivities are given in units of gram of polymer/gram of catalyst-h-100 psi ethylene. The catalyst precursors were prepared according to the sequence below and activated with TEAL.

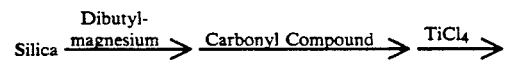

The data show that carbonyl-based catalysts are much more active compared to the control catalyst and produce a polymer product which exhibits a much narrower molecular weight distribution. Also, the carbonyl-based catalysts have a higher flow index response compared to that of the control catalyst.

Thus it is apparent that there has been provided, in accordance with the invention, a catalyst that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A catalyst composition for copolymerization of ethylene with an alpha-olefin, to produce a resin product of narrow molecular weight distribution, wherein the catalyst is prepared by a process which comprises the steps o;

(i) contacting a solid, porous carrier having reactive OH groups in a non-polar liquid with dibutylmagnesium to form a product of step (i) which contains said carrier and incorporated therein a source of magnesium, wherein said dibutylmagnesium is soluble in said non-polar liquid;

(ii) introducing, into the liquid containing said product of step (i), a compound of the formula

wherein R is phenyl or alkyl of 1 to 12 carbon atoms and R' is Cl—, alkyl of 1 to 12 carbon atoms or —OR" wherein R" is phenyl or alkyl of 1 to 8 carbon atoms, to form an intermediate of step (ii), (iii) contacting said intermediate of step (ii) with at least one transition metal compound in a non-polar liquid medium, the number of moles of said transition metal compound being in excess of the number of OH groups on said carrier prior to reaction with said dibutylmagnesium in step (i), said transition metal compound being soluble in said non-polar liquid, and said magnesium-containing carrier being substantially insoluble in said liquid medium, whereby a reacted form of the transition metal becomes supported on said carrier to form a catalyst precursor; and (iv) contacting said catalyst precursor with an activating amount of triethylaluminum.

2. A catalyst composition for copolymerization of ethylene with an alpha-olefin, to produce a resin product of narrow molecular weight distribution, wherein the catalyst is prepared by a process which comprises the steps of:

(i) contacting a solid, porous carrier having reactive OH groups in a non-polar liquid with dibutylmagnesium to form a product of step (i) which contains said carrier and incorporated therein a source of magnesium, wherein said dibutylmagnesium is soluble in said non-polar liquid;

(ii) introducing, into the liquid containing said product of step (i), 2-pentanone to form an intermediate of step (ii);

(iii) contacting said intermediate of step (ii) with at least one transition metal compound in a non-polar liquid medium, the number of moles of said transition metal compound being in excess of the number of OH groups on said carrier prior to reaction with said dibutylmagnesium in step (i), said transition metal compound being soluble in said non-polar liquid, and said magnesium-containing carrier being substantially insoluble in said liquid medium, whereby a reacted form of the transition metal becomes supported on said carrier to form a catalyst precursor; and (iv) contacting said catalyst precursor with an activating amount of triethylaluminum.

3. A catalyst composition for copolymerization of ethylene with an alpha-olefin, to produce a resin product of narrow molecular weight distribution, wherein the catalyst is prepared by a process which comprises the steps of:

(i) contacting a solid, porous carrier having reactive OH groups in a non-polar liquid with dibutylmagnesium to form a product of step (i) which contains said carrier and incorporated therein a source of magnesium, wherein said dibutylmagnesium is soluble in said non-polar liquid;

(ii) introducing, into the liquid containing said product of step (i), propiophenone to form an intermediate of step (ii);

(iii) contacting said intermediate of step (ii) with at least one transition metal compound in a non-polar liquid medium, the number of moles of said transition metal compound being in excess of the number of OH groups on said carrier prior to reaction with said dibutylmagnesium in step (i), said transition metal compound being soluble in said non-polar liquid, and said magnesium-containing carrier being substantially insoluble in said liquid medium, whereby a reacted form of the transition metal becomes supported on said carrier to form a catalyst precursor; and (iv) contacting said catalyst precursor with an activating amount of triethylaluminum.

4. A catalyst composition for copolymerization of ethylene with an alpha-olefin, to produce a resin product of narrow molecular weight distribution, wherein the catalyst is prepared by a process which comprises the steps of:

(i) contacting a solid, porous carrier having reactive OH groups in a non-polar liquid with dibutylmagnesium to form a product of step (i) which contains said carrier and incorporated therein a source of magnesium, wherein said dibutylmagnesium is soluble in said non-polar liquid;

(ii) introducing, into the liquid containing said product of step (i), benzoyl chloride to form an intermediate of step (ii);

(iii) contacting said intermediate of step (ii) with at least one transition metal compound in a non-polar liquid medium, the number of moles of said transition metal compound being in excess of the number of OH groups on said carrier prior to reaction with said dibutylmagnesium in step (i), said transition metal compound being soluble in said non-polar liquid, and said magnesium-containing carrier being substantially insoluble in said liquid medium, whereby a reacted form of the transition metal becomes supported on said carrier to form a catalyst precursor; and (iv) contacting said catalyst precursor with an activating amount of triethylaluminum.

5. A catalyst composition for copolymerization of ethylene with an alpha-olefin, to produce a resin product of narrow molecular weight distribution, wherein the catalyst is prepared by a process which comprises the steps of:

(i) contacting a solid, porous carrier having reactive OH groups in a non-polar liquid with dibutylmagnesium to form a product of step (i) which contains said carrier and incorporated therein a source of magnesium, wherein said dibutylmagnesium is soluble in said non-polar liquid;

(ii) introducing, into the liquid containing said product of step (i), ethyl benzoate to form an intermediate of step (ii);

(iii) contacting said intermediate of step (ii) with at least one transition metal compound in a non-polar liquid medium, the number of moles of said transition metal compound being in excess of the number of OH groups on said carrier prior to reaction with said dibutylmagnesium in step (i), said transition metal compound being soluble in said non-polar liquid, and said magnesium-containing carrier being substantially insoluble in said liquid medium, whereby a reacted form of the transition metal becomes supported on said carrier to form a catalyst precursor; and (iv) contacting said catalyst precursor with an activating amount of triethylaluminum.

6. A catalyst composition for copolymerization of ethylene with an alpha-olefin, to produce a resin product of narrow molecular weight distribution, wherein the catalyst is prepared by a process which comprises the steps of:

(i) contacting a solid, porous carrier having reactive OH groups in a non-polar liquid with dibutylmagnesium to form a product of step (i) which contains said carrier and incorporated therein a source of magnesium, wherein said dibutylmagnesium is soluble in said non-polar liquid;

(ii) introducing, into the liquid containing said product of step (i), propionyl chloride to form an intermediate of step (ii);

(iii) contacting said intermediate of step (ii) with at least one transition metal compound in a non-polar liquid medium, the number of moles of said transition metal compound being in excess of the number of OH groups on said carrier prior to reaction with said dibutylmagnesium in step (i), said transition metal compound being soluble in said non-polar liquid, and said magnesium-containing carrier being substantially insoluble in said liquid medium, whereby a reacted form of the transition metal becomes supported on said carrier to form a catalyst precursor; and (iv) contacting said catalyst precursor with an activating amount of triethylaluminum.

7. A catalyst composition for copolymerization of ethylene with an alpha-olefin, to produce a resin product of narrow molecular weight distribution, wherein the catalyst is prepared by a process which comprises the steps of:

(i) contacting a solid, porous carrier having reactive OH groups in a non-polar liquid with dibutylmagnesium to form a product of step (i) which contains said carrier and incorporated therein a source of magnesium, wherein said dibutylmagnesium is soluble in said non-polar liquid;

(ii) introducing, into the liquid containing said product of step (i), acetyl chloride to form an intermediate of step (ii);

(iii) contacting said intermediate of step (ii) with at least one transition metal compound in a non-polar liquid medium, the number of moles of said transition metal compound being in excess of the number of OH groups on said carrier prior to reaction with said dibutylmagnesium in step (i), said transition metal compound being soluble in said non-polar liquid, and said magnesium-containing carrier being substantially insoluble in said liquid medium, whereby a reacted form of the transition metal becomes supported on said carrier to form a catalyst precursor; and (iv) contacting said catalyst producer with an activating amount of triethylaluminum.

8. The catalyst composition of claim 1, wherein, in step (i), the ratio of the number of moles of said dibutylmagnesium to the number of moles of said OH groups on said silica is from about 1.1 to about 2.5;

wherein in step (ii) the molar ratio of the carbonyl compound to Mg is 0.40 to 1.40.

9. The catalyst of claim 8, wherein, in step (i), the ratio of the number of moles of said dibutylmagnesium to the number of moles of OH groups on said silica is from about 1.0 to about 2.5.

10. A catalyst composition of claim 9, wherein, in step (i), the ratio of the number of moles of said dibutylmagnesium to the number of moles of OH groups on said silica is from about 1.1 to about 1.8.

11. The catalyst of claim 10, wherein the molar ratio of the triethylaluminum to transition metal ranges from 1 to 500.

12. The catalyst of claim 11, wherein the transition metal is provided as tetravalent titanium compound.

13. The catalyst of claim 12, wherein the transition metal is titanium tetrachloride.

14. A catalyst which consists of the catalyst of claim 1.

15. A catalyst which consists of the catalyst of claim 3.

16. A catalyst which consists of the catalyst of claim 4.

17. A catalyst which consists of the catalyst of claim 5.

18. A catalyst which consists of the catalyst of claim 6.

19. A catalyst which consists of the catalyst of claim 7.

20. A catalyst which consists of the catalyst of claim 1.

* * * * *

UNITED STATES PATENT AND TRADEMARK OFFICE
CERTIFICATE OF CORRECTION

PATENT NO. : 5,260,245

DATED : November 9, 1993

INVENTOR(S) : Robert I. Mink et al.

It is certified that error appears in the above-identified patent and that said Letters Patent is hereby corrected as shown below:

Col. 14, line 46, Claim 20, delete "[1]" and insert --2--.

Signed and Sealed this

Twenty-fourth Day of May, 1994

Attest:

BRUCE LEHMAN

Attesting Officer

Commissioner of Patents and Trademarks